United States Patent
Yun et al.

(10) Patent No.: US 9,893,918 B2
(45) Date of Patent: Feb. 13, 2018

(54) APPARATUS AND METHOD FOR TRANSMITTING AND RECEIVING BASED ON FASTER-THAN-NYQUIST

(71) Applicant: ELECTRONICS AND TELECOMMUNICATIONS RESEARCH INSTITUTE, Daejeon (KR)

(72) Inventors: Joungil Yun, Daejeon (KR); Sangwoon Kwak, Daejeon (KR); Hyoungsoo Lim, Daejeon (KR); Young Su Kim, Daejeon (KR); Myung-Sun Baek, Daejeon (KR); Yun Jeong Song, Daejeon (KR); Namho Hur, Sejong-si (KR); Wangrok Oh, Daejeon (KR); Donghoon Kang, Daejeon (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 0 days.

(21) Appl. No.: 15/092,706

(22) Filed: Apr. 7, 2016

(65) Prior Publication Data
US 2017/0099173 A1   Apr. 6, 2017

(30) Foreign Application Priority Data

Oct. 2, 2015 (KR) .................. 10-2015-0139387

(51) Int. Cl.
*H04B 1/04* (2006.01)
*H04L 27/26* (2006.01)

(52) U.S. Cl.
CPC .......... *H04L 27/2608* (2013.01); *H04B 1/04* (2013.01)

(58) Field of Classification Search
CPC ............................ H04B 1/04; H04L 27/2608
USPC ........................................................ 375/260
See application file for complete search history.

(56) References Cited

U.S. PATENT DOCUMENTS

| 6,757,299 B1 * | 6/2004 | Verma ................... H04L 1/0057 370/343 |
| 8,514,966 B2 | 8/2013 | Wajcer et al. |
| 2010/0128776 A1 | 5/2010 | Lee et al. |
| 2010/0146363 A1 | 6/2010 | Birru et al. |
| 2011/0188550 A1 * | 8/2011 | Wajcer ................. H04L 25/068 375/214 |
| 2012/0030534 A1 | 2/2012 | Hwang et al. |
| 2015/0010118 A1 | 1/2015 | Beidas et al. |

* cited by examiner

*Primary Examiner* — Michael Neff
(74) *Attorney, Agent, or Firm* — Kile Park Reed & Houtteman PLLC

(57) ABSTRACT

A Faster-Than-Nyquist (FTN)-based transmitting apparatus segments an input data bit string into a plurality of partial bit strings, simultaneously channel-encodes each of the plurality of partial bit strings, simultaneously modulates each of the plurality of channel encoded bit strings to generate a plurality of modulation symbol sequences, and then pulse-shapes and transmits the plurality of modulation symbol sequences at a speed faster than a Nyquist rate.

18 Claims, 10 Drawing Sheets

APPARATUS AND METHOD FOR TRANSMITTING AND RECEIVING BASED ON FASTER-THAN-NYQUIST

CROSS-REFERENCE TO RELATED APPLICATION

This application claims priority to and the benefit of Korean Patent Application No. 10-2015-0139387 filed in the Korean Intellectual Property Office on Oct. 2, 2015, the entire contents of which are incorporated herein by reference.

BACKGROUND OF THE INVENTION (a) Field of the Invention

The present invention relates to Faster-Than-Nyquist (FTN)-based transmitting/receiving method and apparatus.

(b) Description of the Related Art

A general communication system uses a Nyquist pulse shaping method for transmitting a signal without an inter-symbol interference. The Nyquist pulse shaping method is a pulse shaping method for achieving a maximum data rate at a given bandwidth without the inter-symbol interference. However, the Nyquist pulse shaping method has a limited transmission speed. To improve the problem, an FTN transmission technique has emerged.

The FTN transmission technique is a method for making a pulse shaping period faster while maintaining a pulse shaping form given by a frequency bandwidth as it is to transmit a signal. The FTN transmission technique inevitably causes an inter-symbol interference (ISI) in a transmission signal but may more increase the transmission speed of the transmission signal than the Nyquist pulse shaping method at the same bandwidth.

As such, the FTN transmission technique may increase the transmission speed but inevitably causes the ISI. Therefore, there is a need to remove the ISI in a receiving apparatus.

The receiving apparatus knows an artificial interference pattern due to an FTN transmission parameter and therefore may remove the ISI in the received signal. That is, the receiving apparatus may generate a reference signal including the artificial ISI due to the FTN in the original data and compare the received signal with the reference signal to recover data without interference. In this case, as a comparison length of the received signal with the reference signal including the ISI is getting longer and longer, the accuracy is increased to improve receiving performance, but complexity may be greatly increased.

The above information disclosed in this Background section is only for enhancement of understanding of the background of the invention and therefore it may contain information that does not form the prior art that is already known in this country to a person of ordinary skill in the art.

SUMMARY OF THE INVENTION

The present invention has been made in an effort to provide a Faster-Than-Nyquist (FTN)-based transmitting/receiving method and apparatus capable of improving receiving performance compared to complexity while increasing a transmission speed using an FTN transmission technique.

An exemplary embodiment of the present invention provides a transmitting method by a Faster-Than-Nyquist (FTN)-based transmitting apparatus. The transmitting method includes: segmenting an input data bit string into a plurality of partial bit strings; simultaneously channel-encoding each of the plurality of partial bit strings; simultaneously modulating the plurality of channel encoded bit strings, respectively, to generate a plurality of modulation symbol sequences; and pulse-shaping and transmitting the plurality of modulation symbol sequences at a speed faster than a Nyquist rate.

The transmitting method may further include: prior to the pulse shaping and transmitting, multiplexing the plurality of modulation symbol sequences into one symbol sequence.

The multiplexing may include multiplexing the plurality of modulation symbol sequences to mix symbols of different modulation symbol sequences to be adjacent to each other.

The transmitting method may further include: prior to generating the plurality of modulation symbol sequences, simultaneously interleaving each of the plurality of channel encoded bit strings.

The channel encoding may include channel-encoding each of the plurality of partial bit strings by the same encoding scheme.

Another embodiment of the present invention provides a receiving method by a Faster-Than-Nyquist (FTN)-based receiving apparatus. The receiving method includes: receiving a signal corresponding to a symbol sequence pulse-shaped at a period faster than a Nyquist rate from an FTN pulse shaping filter of an FTN-based transmitting apparatus; filtering the signal with the symbol sequence using a matched filter of the FTN pulse shaping filter; demultiplexing the filtered symbol sequence to be separated into a plurality of symbol sequences; iteratively decoding each of the plurality of symbol sequences until each of the symbol sequences satisfy simultaneously set iterative decoding ending conditions; and serially converting a plurality of bit strings output after the iterative decoding performed until the symbol sequences satisfy an iterative decoding ending condition to output data bit strings.

The iterative decoding may include: removing FTN interference of each of the symbols from each of the symbols of each of the symbol sequences; generating a log-likelihood ratio for each bit of each of the symbol sequences without the FTN interference; deinterleaving the log-likelihood ratios for each bit of each of the symbol sequences; channel-decoding the deinterleaved log-likelihood ratios for each of the symbol sequences to perform an error correction; and repeating the removing of the FTN interference until the symbol sequences satisfy an iterative decoding ending condition, the generating of the log-likelihood ratios, and the deinterleaving of the log-likelihood ratios, and the error correcting.

The removing may include: interleaving the error corrected bit string for each of the symbol sequences when the symbol sequences do not satisfy an iterative decoding ending condition; modulating the interleaved bit strings for each of the symbol sequences into symbol sequences; and estimating the FTN interference of each of the symbols in each of the modulated symbol sequences.

The removing may further include removing the FTN interference of each of the symbols estimated upon the just previous iterative decoding from each of the symbols of each of the symbol sequences.

The estimating of the FTN interference may include estimating the FTN interference due to the FTN pulse shaping filter and the matched filter for each of the symbols of each of the modulated symbol sequences.

The estimating of the FTN interference may include: multiplexing each of the modulated symbol sequences;

pulse-shaping the multiplexed symbol sequences by using an FTN interference filter having a result of convoluting an impulse response of the FTN pulse shaping filter and an impulse response of the matched filter as an impulse response; and generating an FTN interference symbol sequence by subtracting the multiplexed symbol sequence from the pulse shaped symbol sequence.

The removing may include removing each of the FTN interference symbols of the FTN interference symbol sequences from each of the symbols of each of the symbol sequences.

Yet another embodiment of the present invention provides a Faster-Than-Nyquist (FTN)-based transmitting apparatus. The Faster-Than-Nyquist (FTN)-based transmitting apparatus includes: a serial-parallel converter segmenting an input data bit string into a plurality of partial bit strings; a plurality of channel encoders simultaneously channel-encoding each of the plurality of partial bit strings; a plurality of modulators simultaneously modulating the plurality of channel encoded bit strings, respectively, to generate a plurality of modulation symbol sequences; and an FTN pulse shaping filter pulse-shaping and transmitting the plurality of modulation symbol sequences at a speed faster than a Nyquist rate.

The FTN-based transmitting apparatus may further include: a symbol multiplexer multiplexing the plurality of modulation symbol sequences into one symbol sequence and outputting the multiplexed modulation symbol sequences to the FTN pulse shaping filter.

The symbol multiplexer may multiplex the plurality of modulation symbol strings to prevent the symbols of the same modulation symbol sequences from being continued.

The FTN-based transmitting apparatus may further include: a plurality of interleavers simultaneously interleaving each of the plurality of channel encoded bit strings.

Still another embodiment of the present invention provides a Faster-Than-Nyquist (FTN)-based receiving apparatus. The Faster-Than-Nyquist (FTN)-based receiving apparatus includes: a matched filter that is a filter matched with an FTN pulse shaping filter of an FTN-based transmitting apparatus and receives a signal corresponding to a symbol sequence pulse-shaped by the FTN pulse shaping filter and filters the received signal with the symbol sequence; a symbol demultiplexer demultiplexing the filtered symbol sequence and separating the demultiplexed symbol sequence into a plurality of symbol sequences; a plurality of FTN decoders iteratively decoding each of the plurality of symbol sequences simultaneously until the symbol sequences satisfy an iterative decoding ending condition and removing FTN interference of each of the symbols estimated from the corresponding symbol sequence upon just previous iterative decoding in each of the symbol of each of the plurality of symbol sequences; and a parallel-serial converter serially converting a plurality of bit strings output after the iterative decoding until the symbol sequences satisfy the iterative decoding ending condition to output data bit strings.

Each of the plurality of FTN decoders may include: an interference remover removing FTN interference of each of the estimated symbols from each of the symbols of the corresponding symbol sequences; an M-ary demodulator demodulating the corresponding symbol sequence without the FTN interference and generating log-likelihood ratios (LLR) for each of the demodulated bits; a deinterleaver deinterleaving the LLRs for each of the bits of the corresponding symbol sequence; a channel decoder channel-decoding the deinterleaved LLRs for the corresponding symbol sequence to perform an error correction; an interleaver interleaving the error corrected bit string for the corresponding symbol sequence when the result of the iterative decoding does not satisfy the iterative decoding ending condition; and an M-ary modulator modulating the interleaved bit string for the corresponding symbol string into the symbol sequence, and the FTN interference for each of the symbols of each of the symbol sequences is estimated from each of the symbols of the corresponding modulated symbol sequence, and the plurality of FTN decoders each repeat operations of the interference remover, the M-ary demodulator, the deinterleaver, the channel decoder, the interleaver, and the M-ary modulator until a result of the iterative decoding satisfies the iterative decoding ending condition.

The FTN-based receiving apparatus may further include: an FTN interference estimator estimating the FTN interference for each of the symbols of the corresponding modulated symbol sequence by the FTN pulse shaping filter and the matched filter and outputting the FTN interference for each of the symbols of the corresponding symbol sequence to the interference remover.

The FTN interference estimator may include: a symbol multiplexer multiplexing each of the modulated symbol sequences; an FTN interference filter having a result of convoluting the impulse response of the FTN pulse shaping filter and the impulse response of the matched filter as the impulse response and pulse-shaping the multiplexed symbol sequence according to the impulse response; an interference symbol sequence generator generating an FTN interference symbol sequence by subtracting the symbol sequence output from the symbol multiplexer from the symbol sequence output from the FTN interference filter; and a symbol demultiplexer demultiplexing the FTN interference symbol sequence and separating the demultiplexed FTN interference symbol sequence into a plurality of FTN interference symbol sequences and outputting each of the plurality of FTN interference symbols to the corresponding FTN decoder.

DETAILED DESCRIPTION OF THE EMBODIMENTS

Figure 1:
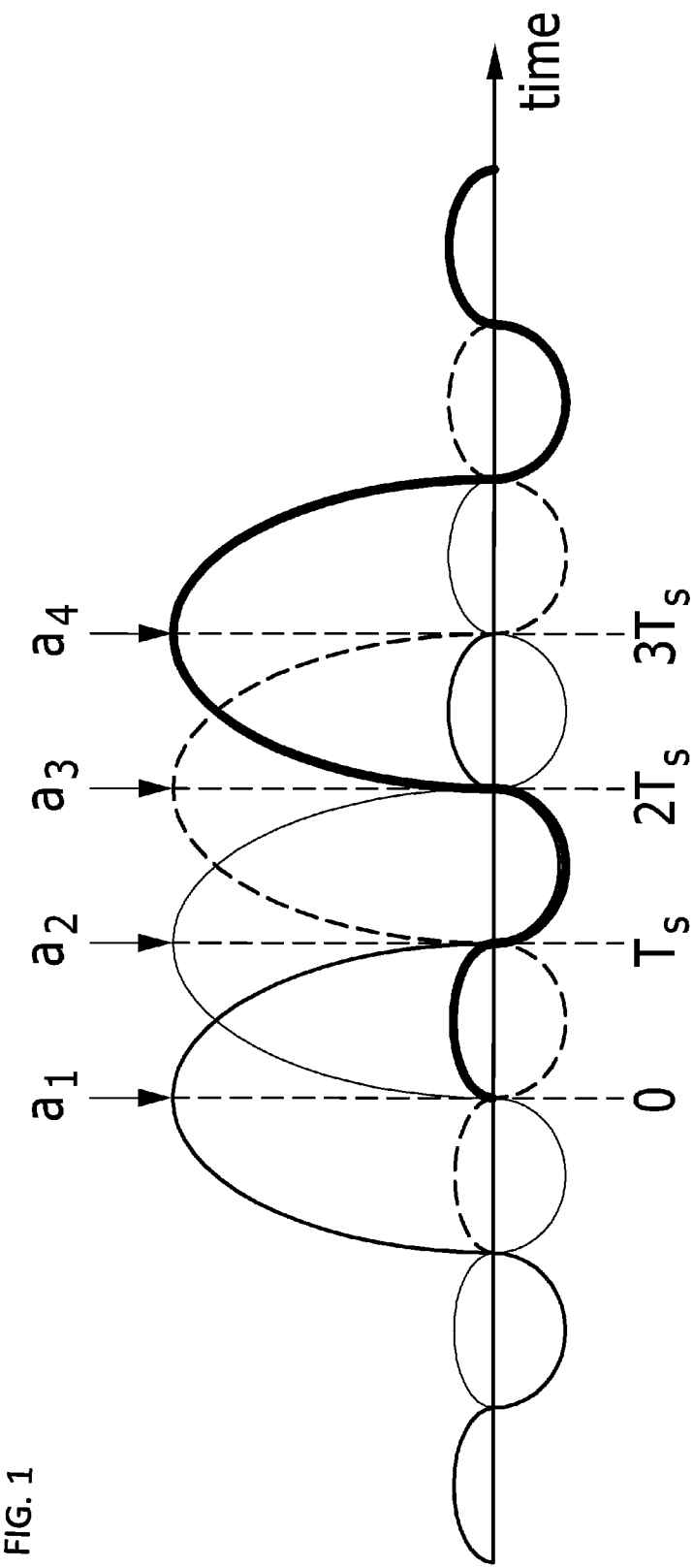
FIG. 1 is a diagram illustrating an output waveform of a pulse shaping filter operated at a Nyquist rate.

In the following detailed description, only certain exemplary embodiments of the present invention have been shown and described, simply by way of illustration. As those skilled in the art would realize, the described embodiments may be modified in various different ways, all without departing from the spirit or scope of the present invention. Accordingly, the drawings and description are to be regarded as illustrative in nature and not restrictive. Like reference numerals designate like elements throughout the specification.

Throughout the specification and claims, unless explicitly described to the contrary, the word "comprise" and variations such as "comprises" or "comprising", will be understood to imply the inclusion of stated elements but not the exclusion of any other elements.

Hereinafter, a Faster-Than-Nyquist (FTN)-based transmitting/receiving method and apparatus according to an exemplary embodiment of the present invention will be described in detail with reference to the accompanying drawings.

Figure 2:
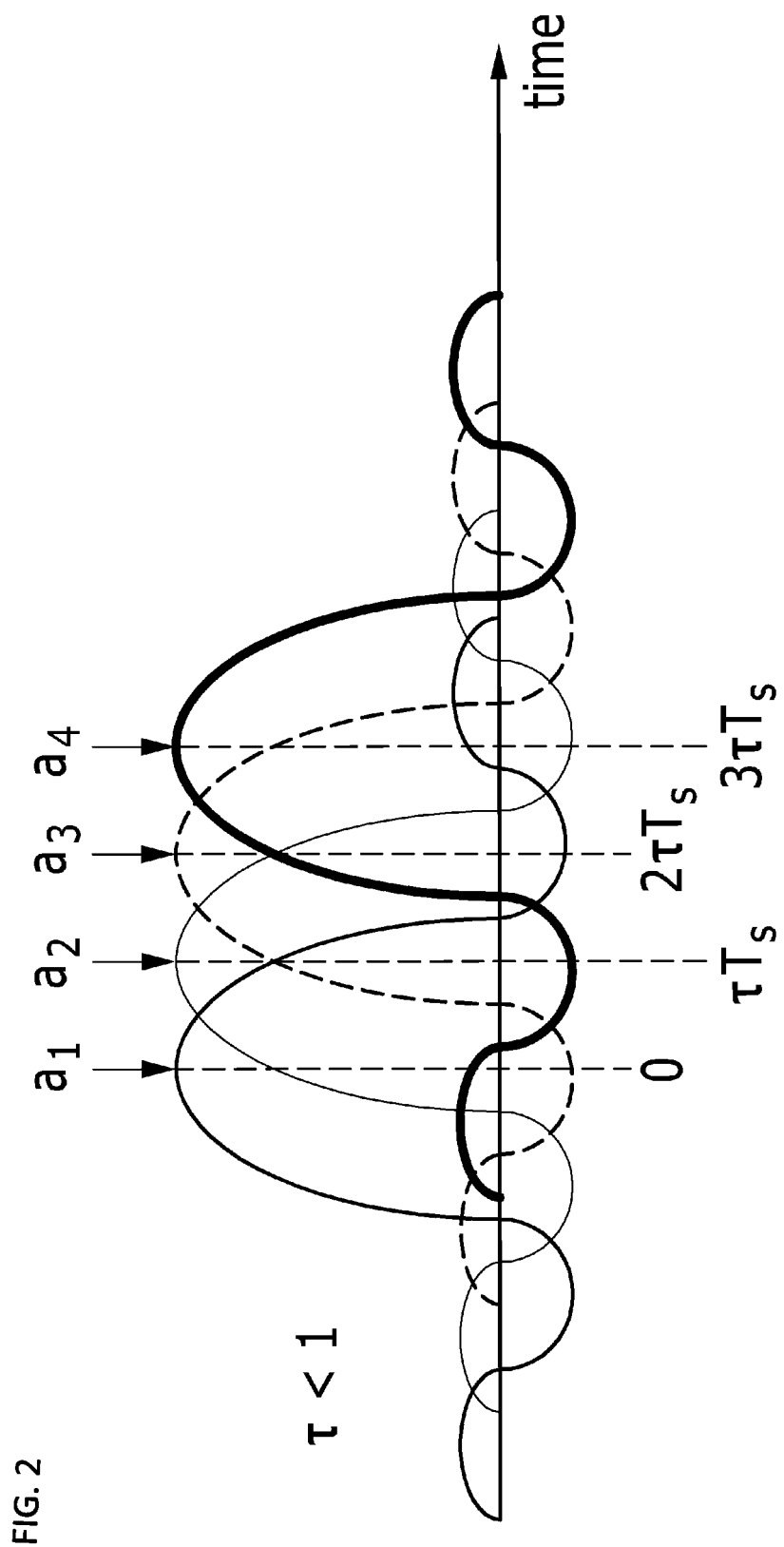
FIG. 2 is a diagram illustrating an output waveform of a pulse shape filter operated by an FTN scheme according to an exemplary embodiment of the present invention.

FIG. 1 is a diagram illustrating an output waveform of a pulse shaping filter operated at a Nyquist rate and FIG. 2 is a diagram illustrating an output waveform of a pulse shape filter operated by an FTN scheme according to an exemplary embodiment of the present invention.

Referring to FIG. 1, if a pulse shaping filter pulse-shapes symbols $a_1$, $a_2$, $a_3$, $a_4$ at a Nyquist rate $\alpha T_s$ that is a speed satisfying inter-symbol orthogonality, the inter-symbol interference does not occur at a given bandwidth. Here, $\alpha$ is an integer equal to or more than 0 and $T_s$ is a symbol transmission period at which a symbol may transmit without inter-symbol interference.

Meanwhile, referring to FIG. 2, if the pulse shaping filter pulse-shapes the symbols $a_1$, $a_2$, $a_3$, and $a_4$ at a period $\alpha \tau T$ faster than the Nyquist rate $\alpha T_s$, the symbol transmission speed may be higher than the Nyquist rate $\alpha T_s$, but the inter-symbol interference (ISI) inevitably occurs. $\tau$ is an FTN transmitting parameter and represents an inter-symbol overlapping degree and has a value between 0 and 1 ($0 < \tau < 1$).

For example, if $\tau$ is 0.5, a signal may be transmitted at a speed twice faster than a scheme of transmitting a signal at a Nyquist rate. As such, a method for transmitting a signal faster than the Nyquist rate is called an FTN transmission technique. Next, the ISI artificially occurring due to the FTN transmission technique is marked by 'FTN interference'.

Figure 3:
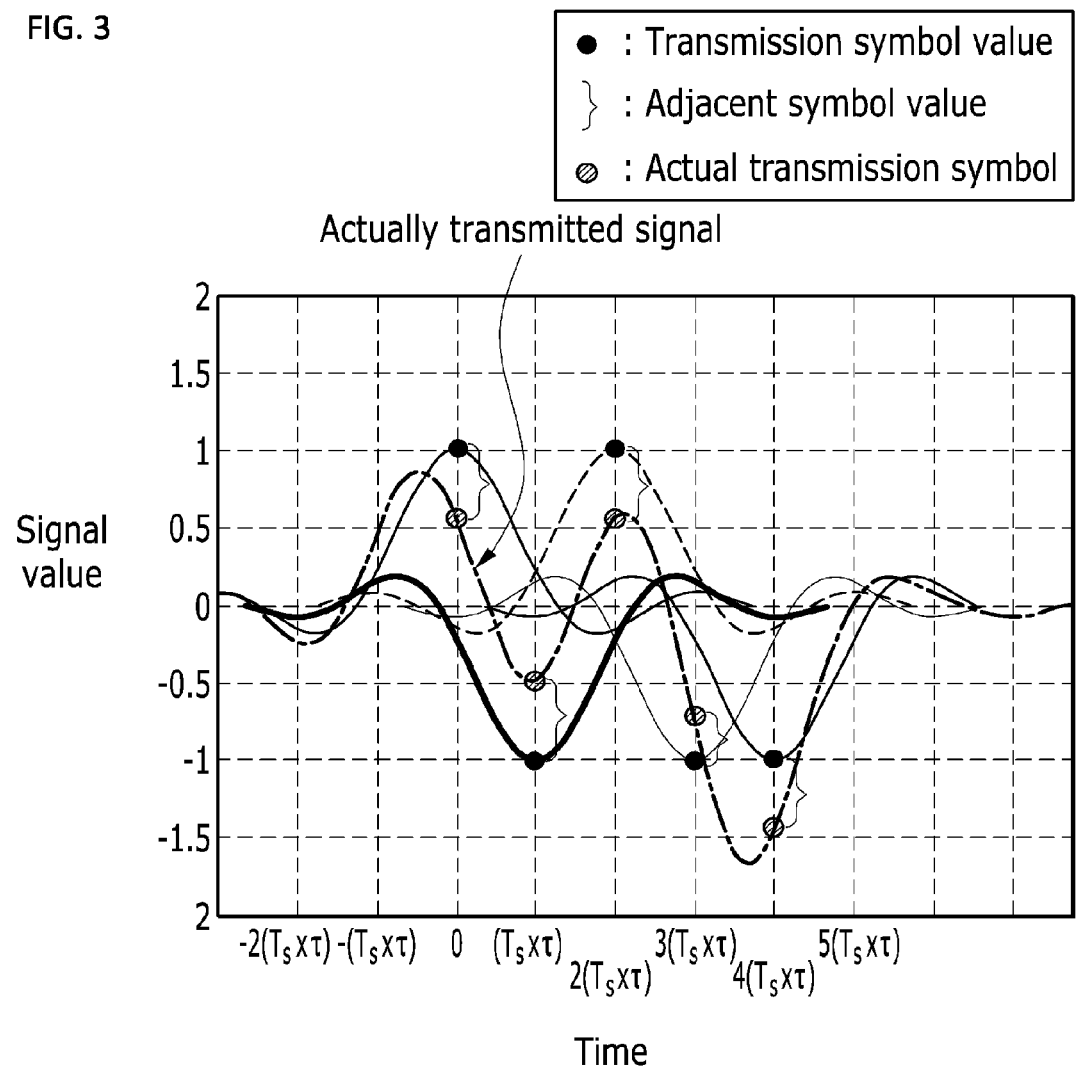
FIG. 3 is a diagram illustrating an example of a signal transmitted by an FTN transmission technique according to an exemplary embodiment of the present invention.

FIG. 3 is a diagram illustrating an example of a signal transmitted by an FTN transmission technique according to an exemplary embodiment of the present invention.

Referring to FIG. 3, if it is assumed that a transmitted signal is [1, −1, 1, −1, 1], the actual transmitted signal passing through a pulse shaping filter having t smaller than 1 becomes a signal with which the FTN interference is combined, not values of [1, −1, 1, −1, −1].

Therefore, a receiving apparatus may remove the FTN interference from the received signal using an interference removal algorithm to recover the transmitted signal [1, −1, 1, −1, −1]. The interference removal algorithm may remove the FTN interference using a previously calculated interference pattern and may use a channel decoder, an equalizer, or the like, such as a Viterbi algorithm and a BCJR algorithm.

Figure 4:
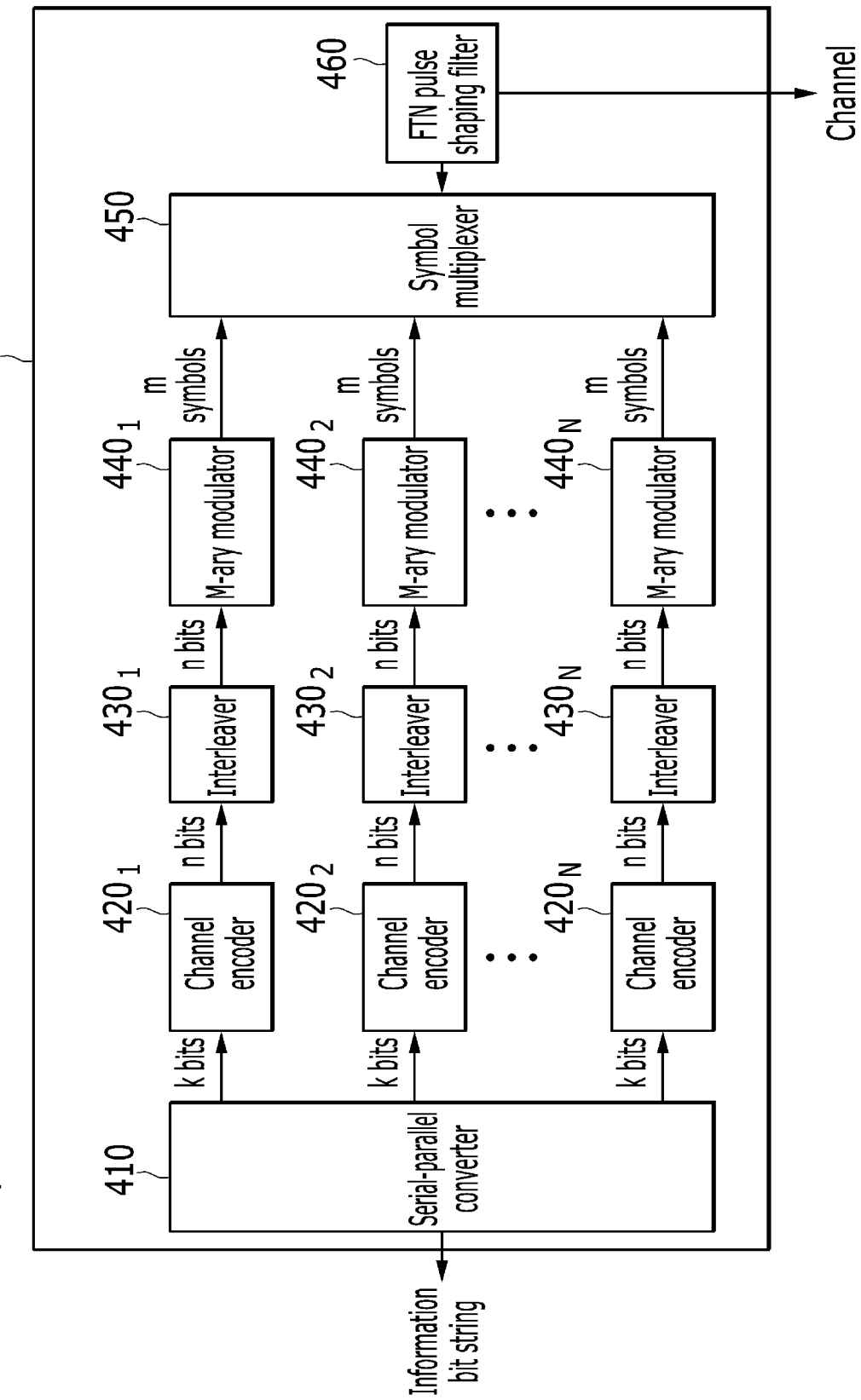
FIG. 4 is a diagram illustrating an FTN-based transmitting apparatus according to an exemplary embodiment of the present invention.
Figure 5:
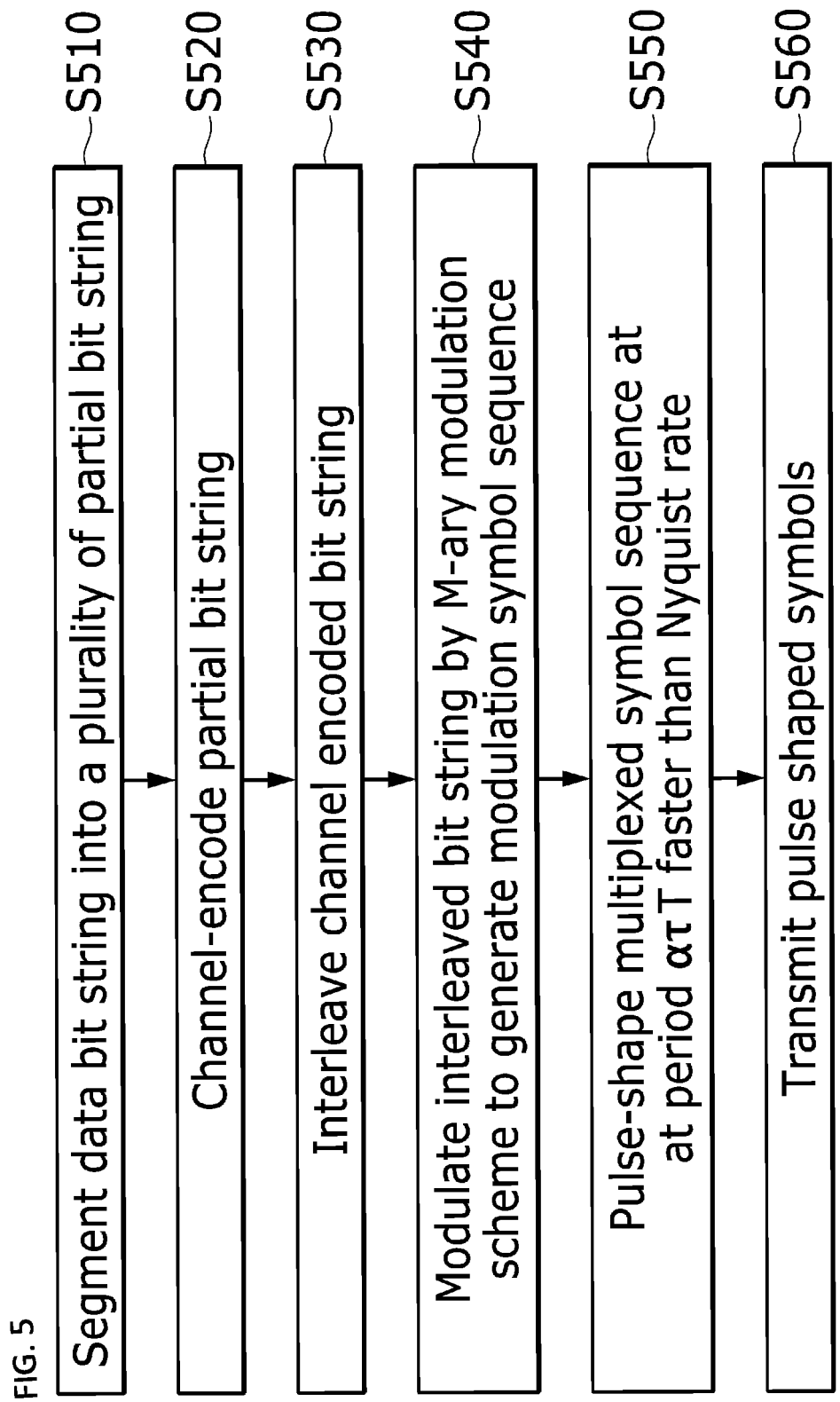
FIG. 5 is a flow chart illustrating an FTN-based transmitting method according to an exemplary embodiment of the present invention.
Figure 6:
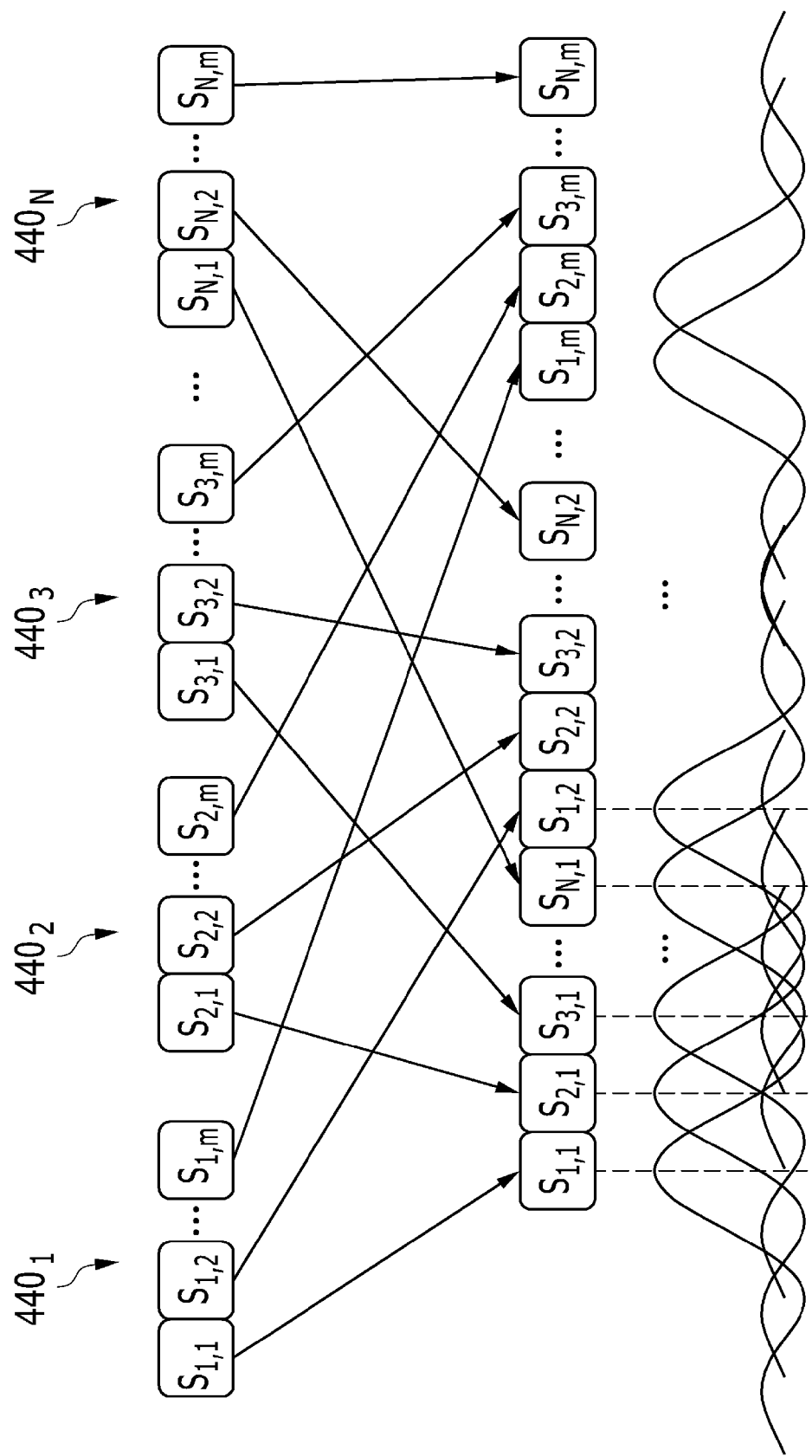
FIG. 6 is a diagram illustrating an example of a multiplexing method of a symbol multiplexer illustrated in FIG. 4.

FIG. 4 is a diagram illustrating an FTN-based transmitting apparatus according to an exemplary embodiment of the present invention, FIG. 5 is a flow chart illustrating an FTN-based transmitting method according to an exemplary embodiment of the present invention, and FIG. 6 is a diagram illustrating an example of a multiplexing method of a symbol multiplexer illustrated in FIG. 4.

Referring to FIG. 4, an FTN-based transmitting apparatus 400 includes a serial-parallel converter 410, a plurality of channel encoders $420_1$-$420_N$, a plurality of interleavers $430_1$-$430_N$, a plurality of M-ary modulators $440_1$-$440_N$, a symbol multiplexer 450, and an FTN pulse shaping filter 460.

Referring to FIG. 5, the serial-parallel converter 410 segments a data bit string input in series into a plurality of partial bit strings (S510) and outputs each of the plurality of partial bit strings to a plurality of channel encoders $420_1$-$420_N$. For example, the serial-parallel converter 410 segments the data bit string into N partial bit strings, in which each partial bit string may include K bits.

The plurality of channel encoders $420_1$-$420_N$ channel-encode the partial bit strings that are individually input (S520) and outputs the channel encoded bit strings. In this case, the channel encoders $420_1$-$420_N$ may be the same channel encoder. For example, if a code rate of the channel encoders $420_1$-$420_N$ is k/n, n encoding bits for k bits are output.

The plurality of interleavers $430_1$-$430_N$ each interleaves the channel encoded bit strings output from the channel encoders $420_1$-$420_N$ and outputs the interleaved channel encoded bits strings to the plurality of M-ary modulators $440_1$-$440_N$ (S530). The interleaving of the interleavers $430_1$-$430_N$ serves to mix the channel encoded bit strings depending on a predetermined rule.

The plurality of M-ary modulators $440_1$-$440_N$ modulate the interleaved bit strings by an M-ary modulation scheme to generate a modulation symbol sequence (S540) and outputs the modulation symbol sequence to the symbol multiplexer 450. As the M-ary modulation scheme, for example, there may be M-PSK, M-QAM, or the like. The modulation symbol sequence may include m symbols, and generally, when M is an integer, has a relationship of $m = n/\log_2 M$.

The symbol multiplexer 450 multiplexes the modulation symbol sequence output from each of the M-ary modulators $440_1$-$440_N$ (S550) and outputs one multiplexed symbol sequence to the FTN pulse shaping filter 460. The symbol multiplexer 450 may multiplex the modulation symbol sequences each output from the M-ary modulators $440_1$-$440_N$ to prevent the symbol of the modulation symbol sequence of the same path from being continuously output. That is, the modulation symbols of each path may be mixed to be adjacent to each other if possible. In the exemplary embodiment of the present invention, a sequence of mixing the modulation symbols of each path is not limited to a specific method, but the exemplary embodiment of the present invention is on the premise that the modulation symbols of each path are mixed to be adjacent to each other if possible.

For example, as illustrated in FIG. 6, if the symbol sequence output from the M-ary modulator $440_i$ is $S_{i,1}$, $S_{i,2}$, ..., $S_{i,m}$, the symbol multiplexer 450 continuously arranges first symbols $S_{1,1}$, $S_{2,1}$, ..., $S_{N,1}$ of the symbol sequence output from the M-ary modulators $440_1$-$440_N$ and then continuously arranges second symbols $S_{1,2}$, $S_{2,2}$, ..., $S_{N,2}$ of the symbol sequence output from the M-ary modulators $440_1$-$440_N$. By this method, final symbols $S_{1,m}$, $S_{2,m}$, ..., $S_{N,m}$ of the symbol sequence sequentially output from the M-ary modulators $440_1$-$440_N$ may be sequentially arranged. By doing so, the symbols of the modulation symbol sequences of the same path are not continuously positioned.

The FTN pulse shaping filter 460 pulse-shapes and outputs the multiplexed symbol sequence at a period ατT faster than a Nyquist rate (S560). The FTN pulse shaping filter 460 has an impulse response g(t) and pulse-shapes and outputs the multiplexed symbol sequence at a predetermined symbol transmission period ατT according to the impulse response g(t). Adjacent symbols of the pulse shaped symbols have correlations due to a structure of a pulse and an interference of previous and following symbols. Further, the number of interference symbols, an interference pattern, or the like are constantly defined depending on τ. According to the exemplary embodiment of the present invention, it is assumed that the FTN pulse shaping filter 460 up-samples the input symbol sequence and pulse-shapes the up-sampled input symbol sequence. The pulse shaped symbols are transmitted to the FTN-based receiving apparatus through a channel via a radio frequency (RF) unit (Not illustrated) (S570).

Figure 7:
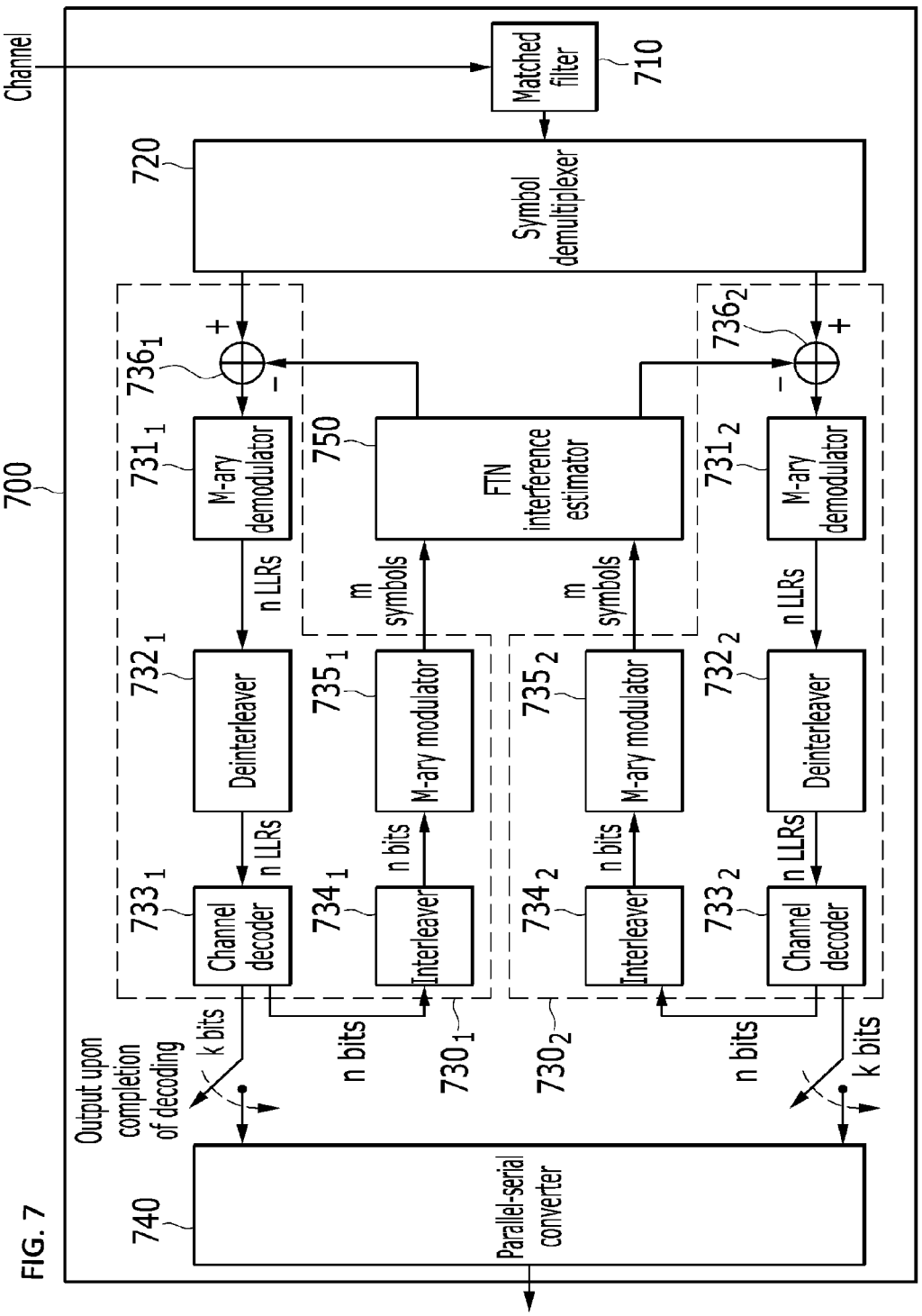
FIG. 7 is a diagram illustrating an FTN-based receiving apparatus according to an exemplary embodiment of the present invention.
Figure 8:
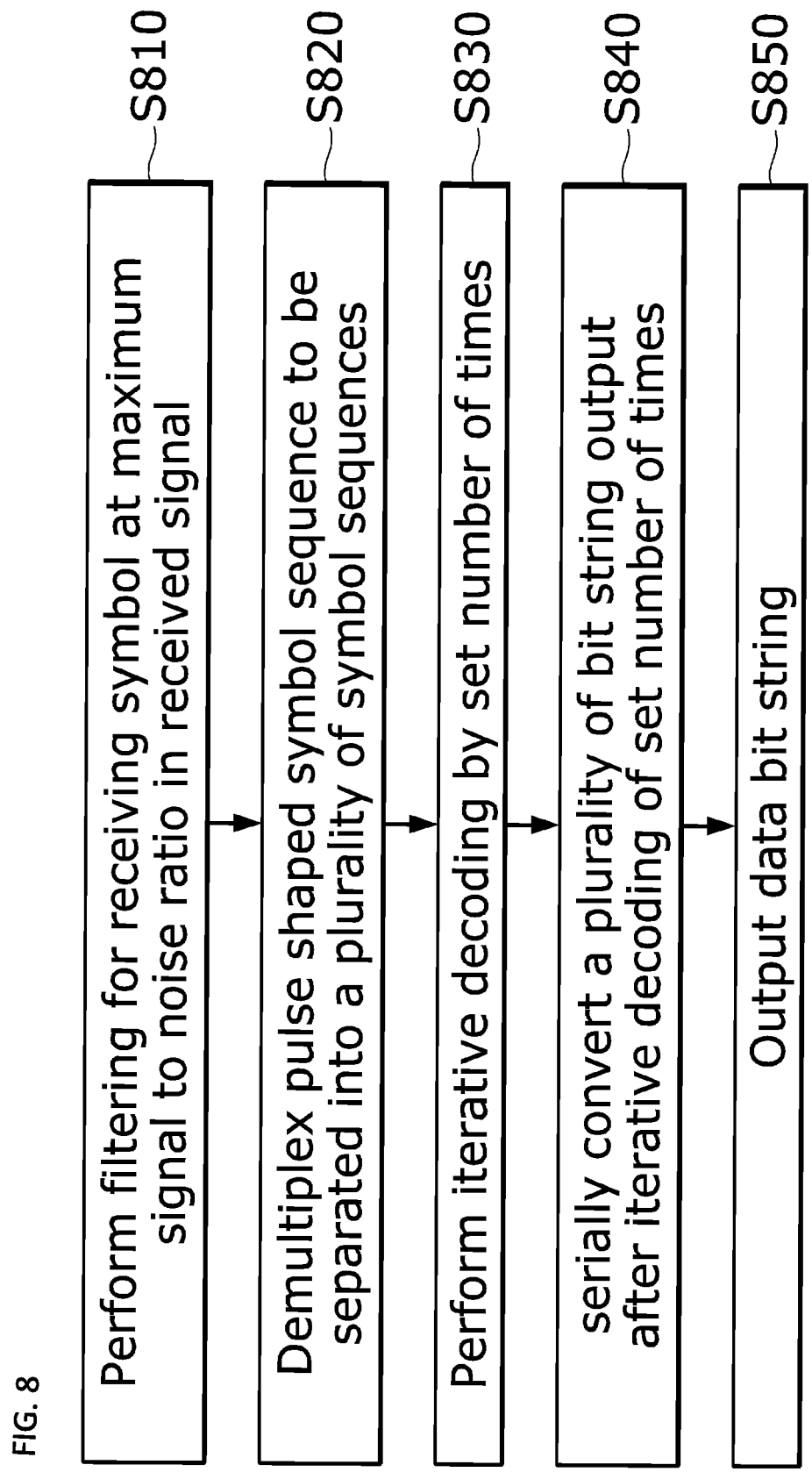
FIG. 8 is a flow chart illustrating an FTN-based receiving method according to an exemplary embodiment of the present invention.

FIG. 7 is a diagram illustrating an FTN-based receiving apparatus according to an exemplary embodiment of the present invention and FIG. 8 is a flow chart illustrating an FTN-based receiving method according to an exemplary embodiment of the present invention.

Referring to FIG. 7, an FTN-based receiving apparatus 700 includes a matched filter 710, a symbol demultiplexer 720, a plurality of FTN decoders $730_1$-$730_N$, a parallel-serial converter 740, and an FTN interference estimator 750. For convenience of explanation, FIG. 7 illustrates the FTN-based receiving apparatus 700 in which N is equal to 2.

The matched filter 710 is a filter of the FTN-based receiving apparatus 700 that is matched with the FTN pulse shaping filter 460 of the FTN-based transmitting apparatus 400. The matched filter 710 has an impulse response g*(T−t) and performs filtering to receive a symbol at a maximum signal-to-noise ratio (SNR) in the received signal according to the impulse response g*(T−t) (S810). According to the exemplary embodiment of the present invention, it is assumed that an output of the matched filter 710 is filtered and down-sampled.

The symbol demultiplexer 720 demultiplexes the symbol sequence filtered by the matched filter 710 and separates the demultiplexed symbol sequence into a plurality of symbol sequences (two symbol sequences in FIG. 7) including the interference of the adjacent symbols (S820) and outputs each of the symbol sequences to FTN decoders $730_1$ and $730_2$.

The FTN decoders $730_1$ and $730_2$ each perform iterative decoding by a predetermined number in times (S830). The FTN decoder $730_1$ and $730_2$ includes M-ary demodulators $731_1$ and $731_2$, deinterleavers $732_1$ and $732_2$, channel decoders $733_1$ and $733_2$, interleavers $734_1$ and $734_2$, M-ary modulators $735_1$ and $735_2$, and interference removers $736_1$ and $736_2$.

In the FTN decoder $730_1$, the M-ary demodulator $731_1$ demodulates the input symbol sequence and generates a log-likelihood ratio (LLR) for each of the demodulated bits. The LLR means a probability ratio for extrinsic information of each bit configuring the symbol sequence. The M-ary demodulator $731_1$ may generate an LLR having an n bit length for a symbol sequence including m symbols. The deinterleaver $732_1$ deinterleaves the LLR output from the M-ary demodulator $731_1$ and outputs the deinterleaved LLR to the channel decoder $733_1$. The channel decoder $733_1$ channel-decodes the deinterleaved LLR to correct an error and transfers the error corrected bit string having an n bit length to the interleaver $734_1$. The error corrected n bit includes a parity bit. In this case, in the iterative decoding process, the channel decoder $733_1$ does not initialize information used in an intrinsic state generated during the error correction process. That is, the iterative decoding process is included in the channel decoding process. The interleaver $734_1$ interleaves the error corrected bit string by the same method as the interleaving of the interleavers $430_1$-$430_N$ illustrated in FIG. 4 and transfers the interleaved error corrected bit string to the M-ary modulator $735_1$ and the M-ary modulator $735_1$ modulates the bit string interleaved by the same method as the M-ary modulators $440_1$-$440_N$ illustrated in FIG. 4 into the symbol sequence and transfers the modulated symbol sequence to the FTN interference estimator 750. Further, the interference remover $736_1$ removes the FTN interference of each of the symbols for the corresponding symbol sequence estimated by the FTN interference estimator 750 from each of the symbols of the symbol sequence input from the symbol demultiplexer 720 and outputs the symbol sequence from which the FTN interference is removed to the M-ary demodulator $731_1$.

Similarly, in the FTN decoder $730_2$, the M-ary demodulator $731_2$ demodulates the input symbol sequence and generates LLRs for each of the demodulated bits. The deinterleaver $732_2$ deinterleaves the LLR output from the M-ary demodulator $731_2$ and outputs the deinterleaved LLR to the channel decoder $733_2$. The channel decoder $733_2$ channel-decodes the deinterleaved LLR to correct an error and transfers the error corrected bit string having an n bit length to the interleaver $734_2$. The interleaver $734_2$ interleaves the error corrected bit string by the same method as the interleaving of the interleavers $430_1$-$430_N$ illustrated in FIG. 4 and transfers the interleaved error corrected bit string to the M-ary modulator $735_2$ and the M-ary modulator $735_2$ converts the interleaved bit string for the FTN interference estimation into the symbol sequence which is in turn transferred to the FTN interference estimator 750. Further, the interference remover $736_1$ removes the FTN interference of each of the symbols for the corresponding symbol sequence estimated by the FTN interference estimator 750 from each of the symbols of the symbol sequence input from the symbol demultiplexer 720 and outputs the symbol sequence from which the FTN interference is removed to the M-ary demodulator $731_2$.

The FTN interference estimator 750 estimates the FTN interference for each of the symbols of each of the symbol sequences using the FTN pulse shaping filter 460 of FIG. 4 and the matched filter 710 of FIG. 7 and transfers the FTN interference for each of the symbols of each of the estimated symbol sequences to the interference removers $736_1$ and $736_2$ of the corresponding FTN decoders $730_1$ and $730_2$.

Consequently, the M-ary demodulators $731_1$ and $731_2$ of the FTN decoders $730_1$ and $730_2$ may calculate LLRs for each bit of the symbol sequence without the FTN interference from the second iterative decoding.

The parallel-serial converter 740 serially converts a plurality of bit strings output from the FTN decoder $730_1$ and $730_2$ after the iterative decoding of the set number of times and finally outputs the data bits string (S840-S850).

Figure 9:
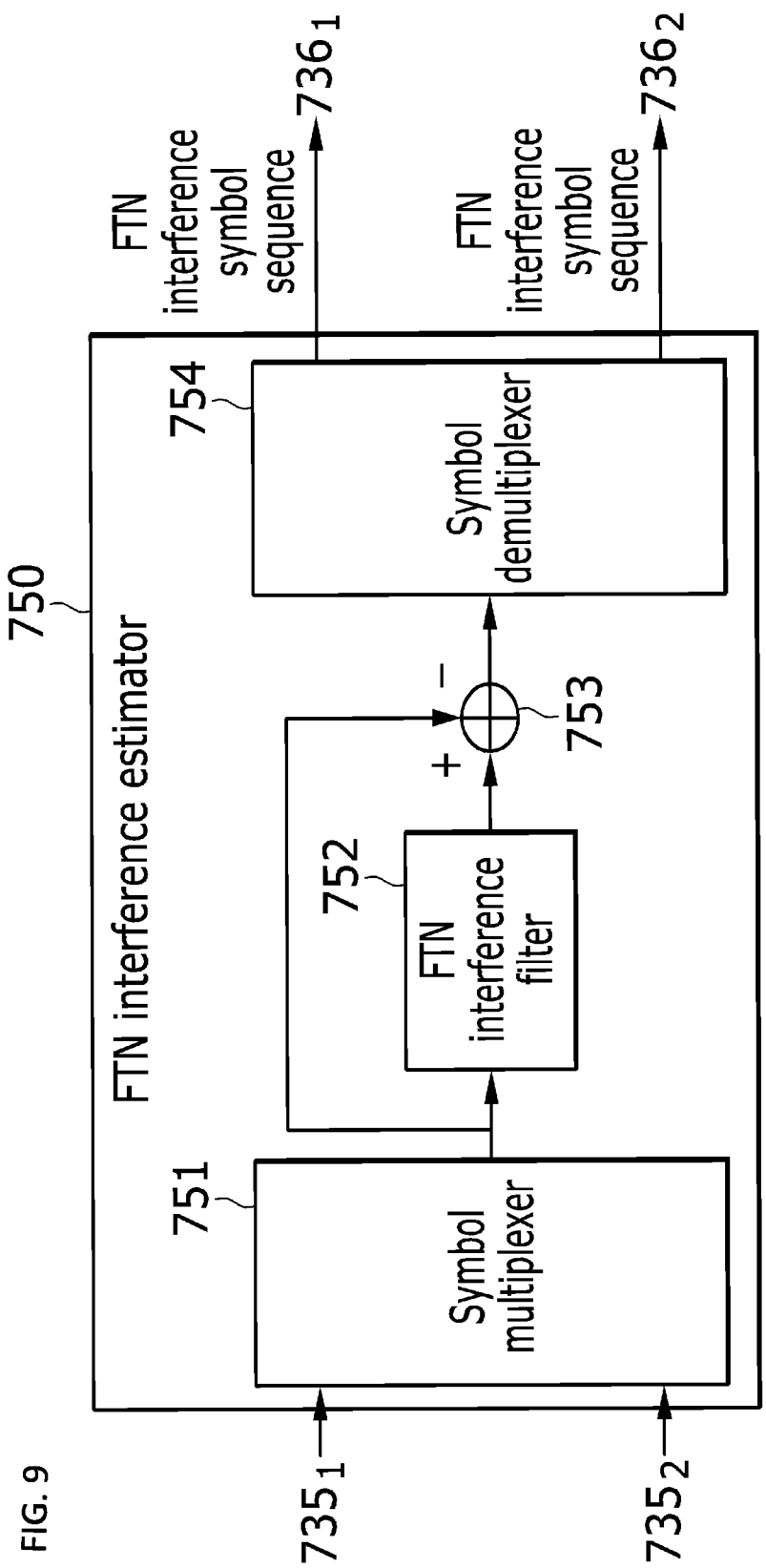
FIG. 9 is a diagram illustrating an FTN interference estimator illustrated in FIG. 7.

FIG. 9 is a diagram illustrating the FTN interference estimator illustrated in FIG. 7.

Referring to FIG. 9, the FTN interference estimator 750 includes a symbol multiplexer 751, an FTN interference filter 752, an interference symbol sequence generator 753, and a symbol demultiplexer 754.

The symbol multiplexer 751 of FIG. 9 performs the same function as the symbol multiplexer 450 illustrated in FIG. 4.

The symbol multiplexer 751 multiplexes the modulation symbol sequences output from the M-ary modulators 735$_1$ and 735$_2$ respectively, by the same method as the symbol multiplexer 450 of FIG. 4 and transfers the multiplexed modulation symbol sequences to the FTN interference filter 752.

The FTN interference filter 752 is the same as continuously using the FTN pulse shaping filter 460 of FIG. 4 and the matched filter 710 of FIG. 7. That is, the FTN interference filter 752 has a result of convoluting the g(t) and the g*(T−t) as the impulse response. In the exemplary embodiment of the present invention, it is assumed that the input symbol of the FTN interference filter 752 is up-sampled before the filtering and down-sampled after the filtering.

The multiplexed symbol sequence includes the inter-symbol interference while passing through the FTN interference filter 752. The FTN interference symbol sequence may be obtained by subtracting the symbol sequence output from the symbol multiplexer 751 from the symbol sequence including the inter-symbol interference. The FTN interference symbol means the symbol sequence including only the FTN interference by the adjacent symbols of each of the symbols. That is, the interference symbol sequence generator 753 subtracts the symbol sequence output from the symbol multiplexer 751 from the symbol sequence output from the FTN interference filter 752 to generate the FTN interference symbol sequence and output the FTN interference symbol sequence to the symbol demultiplexer 754.

The symbol demultiplexer 754 demultiplexes the FTN interference symbol sequence by the same method as the symbol demultiplexer 720 illustrated in FIG. 7 and separates the demultiplexed FTN interference symbol into a plurality of FTN interference symbol sequences and outputs the demultiplexed FTN interference symbol sequence to the FTN decoders 730$_1$ and 730$_2$.

Figure 10:
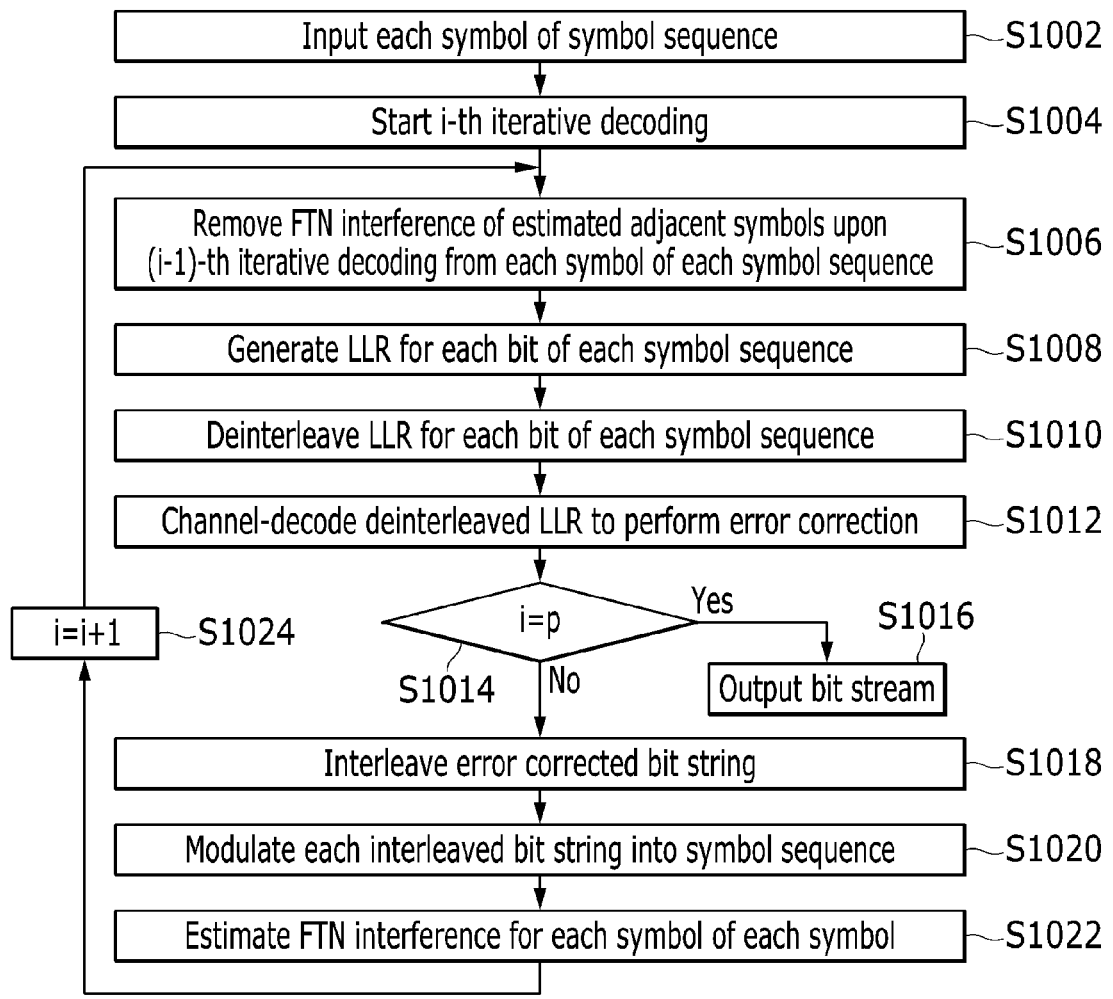
FIG. 10 is a flow chart illustrating an iterative decoding method according to an exemplary embodiment of the present invention.

FIG. 10 is a flow chart illustrating an iterative decoding method according to an exemplary embodiment of the present invention.

Referring to FIG. 10, when each of the symbols of the symbol sequence is input (S1002), the FTN decoders 730$_1$ and 730$_2$ each start i-th iterative decoding (S1004).

The FTN decoders 730$_1$ and 730$_2$ each demodulate the symbol sequence and generate LLRs for each bit of the demodulated symbol sequence. In this case, the FTN decoders 730$_1$ and 730$_2$ remove the FTN interference of the adjacent symbols estimated upon (i−1)-th iterative decoding from each of the symbols of the input symbol sequence (S1006) and then may demodulate the symbol sequence to generate LLRs for each bit (S1008). When i=1, the FTN interference of the estimated adjacent symbols is considered to be 0.

The FTN decoders 730$_1$ and 730$_2$ deinterleave LLRs for each of the demodulated bits of the symbol sequence (S1010) and channel-decode the deinterleaved LLRs to correct an error (S1012).

The FTN decoders 730$_1$ and 730$_2$ each confirm whether i is a predetermined iteration number p (S1014) and if it is determined that i is the predetermined iteration number p, output the error corrected bit string (S1016).

Meanwhile, the FTN decoders 730$_1$ and 730$_2$ each interleave the error corrected bit string having an n bit length if it is determined that i is not the predetermined iteration number p (S1018) and then modulate the interleaved bit string into the symbol sequence (S1020). The FTN interference estimator 750 estimates the FTN interference for each of the symbols of each of the symbol sequences (S1022). The estimated FTN interference for each of the symbols of each of the symbol sequences is output to the FTN decoders 730$_1$ and 730$_2$ and the estimated FTN interference of each of the symbols is used upon the LLR generation during the subsequent iterative decoding.

One-time iterative decoding is completed by the method.

The FTN decoders 730$_1$ and 730$_2$ each increase i by 1 (S1024) and then perform steps S1004-S1012.

Further, the FTN decoders 730$_1$ and 730$_2$ iterate steps S1014-S1024 and S1004-S1012 until i becomes the set iteration number p.

Meanwhile, the exemplary embodiment of the present invention describes that the repeated operations of the FTN decoder 730$_1$ and 730$_2$ are determined by comparing the iteration number but may control the iterative operations of the FTN decoder 730$_1$ and 730$_2$ by a method for comparing whether an interference removal level reaches a targeted level, or the like.

That is, the FTN decoders 730$_1$ and 730$_2$ perform the iterative decoding process until the result of the iterative decoding satisfies the iterative decoding ending condition, in which the iterative decoding ending condition may include the set iteration number or the targeted interference removal level as described above.

As such, according to the exemplary embodiment of the present invention, the FTN-based transmitting apparatus 400 channel-encodes a plurality of partial bit strings independently and multiplexes the independently channel encoded bit strings by multiplexing and then transmits the multiplexed symbol sequence by the FTN transmission technique. By doing so, the symbols have correlation with each other due to the artificial interference due to the FTN transmission parameter and since the FTN-based receiving apparatus 700 knows the pattern of the correlation in advance, the FTN-based receiving apparatus 700 may simultaneously decode the independently channel encoded bit strings to obtain the receiving performance similar to that using a channel code having, for example, a length of n*N.

Compared to a transceiver encoding k*N input bits at a time, the FTN-based transmitting/receiving apparatus according to the exemplary embodiment of the present invention may implement parallelization and therefore may be considered to have an advantage in receiving complexity. By using the channel code having a frame size of n*N by encoding the input bit at a time, the performance of the channel code may be increased to obtain high performance but generally, a turbo-like code (turbo code, LDPC code, or the like) greatly increases decoding complexity depending on the frame size and an operation delay occurs. The FTN-based receiving apparatus 700 according to the exemplary embodiment of the present invention may decode each channel code having a frame size of n independently to decrease the decoding complexity and may increase the operation speed when the channel code is calculated in parallel.

Further, the transmitting/receiving structure according to the exemplary embodiment of the present invention may be used in a system for controlling a frame size according to communication environment. That is, the transmitting/receiving structure according to the exemplary embodiment of the present invention may implement the communication system that may variably configure the unit frame size of the transmission frame by increasing or decreasing the number of channel encoders and the number of channel decoders processing the bit strings that are connected in parallel and have a fixed length.

Further, the FTN-based transmitting/receiving structure according to the exemplary embodiment of the present invention may also be applied to the FTN-based multicarrier system.

According to an exemplary embodiment of the present invention, it is possible to obtain the channel code performance similar to increasing the frame size of the channel code by giving the association between the independent symbol sequences based on the ISI occurring due to the FTN while increasing the transmission speed using the FTN transmission technique. Further, it is possible to configure the variable transmission frame only by increasing or decreasing the channel encoders connected in parallel and improve the receiving performance compared to the complexity by parallelizing the FTN decoder.

The exemplary embodiments of the present invention are not implemented only by the apparatus and/or method as described above, but may be implemented by programs realizing the functions corresponding to the configuration of the exemplary embodiments of the present invention or a recording medium recorded with the programs, which may be readily implemented by a person having ordinary skill in the art to which the present invention pertains from the description of the foregoing exemplary embodiments.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

What is claimed is:

1. A transmitting method by a Faster-Than-Nyquist (FTN)-based transmitting apparatus, comprising:
   segmenting an input data bit string into a plurality of partial bit strings;
   simultaneously channel-encoding each of the plurality of partial bit strings;
   simultaneously modulating the plurality of channel encoded bit strings, respectively, to generate a plurality of modulation symbol sequences;
   pulse-shaping and transmitting the plurality of modulation symbol sequences at a speed faster than a Nyquist rate; and
   prior to the pulse shaping and transmitting, multiplexing the plurality of modulation symbol sequences to mix symbols of different modulation symbol sequences to be adjacent to each other.

2. The transmitting method of claim 1, wherein:
   the multiplexing includes multiplexing the plurality of modulation symbol sequences into one symbol sequence.

3. The transmitting method of claim 1, further comprising:
   prior to the generating of the plurality of modulation symbol sequences, simultaneously interleaving each of the plurality of channel encoded bit strings.

4. The transmitting method of claim 1, wherein:
   the channel encoding includes channel-encoding each of the plurality of partial bit strings by the same encoding scheme.

5. A receiving method by a Faster-Than-Nyquist (FTN)-based receiving apparatus, comprising:
   receiving a signal corresponding to a symbol sequence pulse-shaped at a period faster than a Nyquist rate from an FTN pulse shaping filter of an FTN-based transmitting apparatus;
   filtering the signal with the symbol sequence using a matched filter of the FTN pulse shaping filter;
   demultiplexing the filtered symbol sequence to be separated into a plurality of symbol sequences;
   iteratively decoding each of the plurality of symbol sequences until each of the symbol sequences satisfies simultaneously a set of iterative decoding ending conditions; and
   serially converting a plurality of bit strings output after the iterative decoding performed until the symbol sequences satisfy an iterative decoding ending condition to output data bit strings.

6. The receiving method of claim 5, wherein:
   the iterative decoding includes
   removing FTN interference of each of the symbols from each of the symbols of each of the symbol sequences;
   generating a log-likelihood ratio for each bit of each of the symbol sequences without the FTN interference;
   deinterleaving the log-likelihood ratios for each bit of each of the symbol sequences;
   channel-decoding the deinterleaved log-likelihood ratios for each of the symbol sequences to perform an error correction; and
   repeating the removing of the FTN interference until the symbol sequences satisfy an iterative decoding ending condition, the generating of the log-likelihood ratios, and the deinterleaving of the log-likelihood ratios, and the error correcting.

7. The receiving method of claim 6, wherein:
   the removing includes:
   interleaving the error corrected bit string for each of the symbol sequences when the symbol sequences do not satisfy an iterative decoding ending condition;
   modulating the interleaved bit strings for each of the symbol sequences into symbol sequences; and
   estimating the FTN interference of each of the symbols in each of the modulated symbol sequences.

8. The receiving method of claim 7, wherein:
   the removing further includes removing the FTN interference of each of the symbols estimated upon the just previous iterative decoding from each of the symbols of each of the symbol sequences.

9. The receiving method of claim 7, wherein:
   the estimating of the FTN interference includes estimating the FTN interference due to the FTN pulse shaping filter and the matched filter for each of the symbols of each of the modulated symbol sequences.

10. The receiving method of claim 7, wherein:
    the estimating of the FTN interference includes:
    multiplexing each of the modulated symbol sequences;
    pulse-shaping the multiplexed symbol sequences by using an FTN interference filter having a result of convoluting an impulse response of the FTN pulse shaping filter and an impulse response of the matched filter as an impulse response; and
    generating an FTN interference symbol sequence by subtracting the multiplexed symbol sequence from the pulse shaped symbol sequence.

11. The receiving method of claim 10, wherein:
    the removing includes removing each of the FTN interference symbols of the FTN interference symbol sequences from each of the symbols of each of the symbol sequences.

12. A Faster-Than-Nyquist (FTN)-based transmitting apparatus, comprising:
- a serial-parallel converter segmenting an input data bit string into a plurality of partial bit strings;
- a plurality of channel encoders simultaneously channel-encoding each of the plurality of partial bit strings;
- a plurality of modulators simultaneously modulating the plurality of channel encoded bit strings, respectively, to generate a plurality of modulation symbol sequences;
- an FTN pulse shaping filter pulse-shaping and transmitting the plurality of modulation symbol sequences at a speed faster than a Nyquist rate; and
- a symbol multiplexer configured to multiplex the plurality of modulation symbol strings to prevent the symbols of the same modulation symbol sequences from being continued.

13. The FTN-based transmitting apparatus of claim 12, wherein:
the symbol multiplexer is further configured to multiplex the plurality of modulation symbol sequences into one symbol sequence and output the multiplexed modulation symbol sequences to the FTN pulse shaping filter.

14. The FTN-based transmitting apparatus of claim 12, further comprising:
a plurality of interleavers simultaneously interleaving each of the plurality of channel encoded bit strings.

15. A Faster-Than-Nyquist (FTN)-based receiving apparatus, comprising:
- a matched filter that is a filter matched with an FTN pulse shaping filter of an FTN-based transmitting apparatus and receives a signal corresponding to a symbol sequence pulse-shaped by the FTN pulse shaping filter and filters the received signal with the symbol sequence;
- a symbol demultiplexer demultiplexing the filtered symbol sequence and separating the demultiplexed symbol sequence into a plurality of symbol sequences;
- a plurality of FTN decoders iteratively decoding each of the plurality of symbol sequences simultaneously until the symbol sequences satisfy an iterative decoding ending condition and removing FTN interference of each of the symbols estimated from the corresponding symbol sequence upon just previous iterative decoding in each of the symbol of each of the plurality of symbol sequences; and
- a parallel-serial converter serially converting a plurality of bit strings output after the iterative decoding until the symbol sequences satisfy the iterative decoding ending condition to output data bit strings.

16. The FTN-based receiving apparatus of claim 15, wherein:
each of the plurality of FTN decoders includes
an interference remover removing FTN interference of each of the estimated symbols from each of the symbols of the corresponding symbol sequences;
an M-ary demodulator demodulating the corresponding symbol sequence without the FTN interference and generating log-likelihood ratios (LLR) for each of the demodulated bits;
deinterleaver deinterleaving the LLRs for each of the bits of the corresponding symbol sequence;
a channel decoder channel-decoding the deinterleaved LLRs for the corresponding symbol sequence to perform an error correction;
an interleaver interleaving the error corrected bit string for the corresponding symbol sequence when the result of the iterative decoding does not satisfy the iterative decoding ending condition; and
an M-ary modulator modulating the interleaved bit string for the corresponding symbol string into the symbol sequence, and
the FTN interference for each of the symbols of each of the symbol sequences is estimated from each of the symbols of the corresponding modulated symbol sequence, and
the plurality of FTN decoders each repeat operations of the interference remover, the M-ary demodulator, the deinterleaver, the channel decoder, the interleaver, and the M-ary modulator until a result of the iterative decoding satisfies the iterative decoding ending condition.

17. The FTN-based receiving apparatus of claim 15, further comprising:
an FTN interference estimator estimating the FTN interference for each of the symbols of the corresponding modulated symbol sequence by the FTN pulse shaping filter and the matched filter and outputting the FTN interference for each of the symbols of the corresponding symbol sequence to the interference remover.

18. The FTN-based receiving apparatus of claim 17, wherein:
the FTN interference estimator includes:
a symbol multiplexer multiplexing each of the modulated symbol sequences;
an FTN interference filter having a result of convoluting the impulse response of the FTN pulse shaping filter and the impulse response of the matched filter as the impulse response and pulse-shaping the multiplexed symbol sequence according to the impulse response;
an interference symbol sequence generator generating an FTN interference symbol sequence by subtracting the symbol sequence output from the symbol multiplexer from the symbol sequence output from the FTN interference filter; and
a symbol demultiplexer demultiplexing the FTN interference symbol sequence and separating the demultiplexed FTN interference symbol sequence into a plurality of FTN interference symbol sequences and outputting each of the plurality of FTN interference symbols to the corresponding FTN decoder.

* * * * *